United States Patent
Chang et al.

[11] Patent Number: 6,132,609
[45] Date of Patent: Oct. 17, 2000

[54] COMBINATION WATER FILTER TANK

[76] Inventors: Tsun Shin Chang, No. 128-3, Ta Jung E. St., Hsi Tun Dist., Taichung; Shih Ching Chuang, 6Fl, No. 23, Lane 308, Kuang Fu S. Rd., Taipei, both of Taiwan

[21] Appl. No.: 09/477,065

[22] Filed: Jan. 4, 2000

[51] Int. Cl.7 ................................................. B01D 21/02
[52] U.S. Cl. .................... 210/252; 210/320; 210/322; 210/532.1; 210/534
[58] Field of Search .................. 210/252, 320, 210/322, 532.1, 534

[56] References Cited

U.S. PATENT DOCUMENTS

| | | |
|---|---|---|
| 357,349 | 2/1887 | Waring, Jr. . |
| 2,782,929 | 2/1957 | Colket . |
| 4,377,017 | 3/1983 | Herpers et al. . |
| 4,997,562 | 3/1991 | Warner . |
| 5,445,730 | 8/1995 | Pattee . |

*Primary Examiner*—Thomas M. Lithgow
*Attorney, Agent, or Firm*—Bacon & Thomas, PLLC

[57] ABSTRACT

A combination water filter tank, which includes a rectangular housing, three transverse partition boards disposed in the housing and defining a first sedimentation chamber, a second sedimentation chamber, a third sedimentation chamber and a fourth sedimentation chamber, a water inlet for guiding water from an external water source into the first sedimentation chamber, a plurality of first longitudinal partition boards of different heights respectively disposed in the first sedimentation chamber, three L-shaped water guide boards respectively suspended in the second sedimentation chamber, third sedimentation chamber and fourth sedimentation chamber, a plurality of second longitudinal partition boards respectively disposed in the second sedimentation chamber, third sedimentation chamber and fourth sedimentation chamber on the middle at an elevation below the L-shaped water guide boards, and a water outlet for guiding water out of the fourth sedimentation chamber.

2 Claims, 2 Drawing Sheets

COMBINATION WATER FILTER TANK

BACKGROUND OF THE INVENTION

The present invention relates to a water filter tank, and more particularly to a combination water filter tank, which guides water to flow up and down, enabling solid matter to settle to the bottom.

A variety of water filters have been disclosed, and have appeared on the market. These water filters commonly use a filter element to remove solid matter from water. However, because the filter element has a limited service life, it must be frequently replaced. If the filter element is overused, water cannot be well purified.

SUMMARY OF THE INVENTION

It is the main object of the present invention to provide a combination water filter tank, which enables solid matter to settle to the bottom of the water passing through without the use of any filter element. According to one aspect of the present invention, the combination water filter tank comprises a rectangular housing, three transverse partition boards disposed in the housing and defining a first sedimentation chamber, a second sedimentation chamber, a third sedimentation chamber and a fourth sedimentation chamber, a water inlet for guiding water from an external water source into the first sedimentation chamber, a plurality of first longitudinal partition boards of different heights respectively disposed in the first sedimentation chamber, three L-shaped water guide boards respectively suspended in the second sedimentation chamber, third sedimentation chamber and fourth sedimentation chamber, a plurality of second longitudinal partition boards respectively disposed in the second sedimentation chamber, third sedimentation chamber and fourth sedimentation chamber on the middle at an elevation below the L-shaped water guide boards, and a water outlet for guiding water out of the fourth sedimentation chamber. According to another aspect of the present invention, the sedimentation chambers each comprise a bottom wall, and at least one drain hole on the bottom wall for guiding sediment out of the housing, wherein the bottom wall is curved inwards toward the at least one drain hole for enabling sediment to be accumulated at the at least one drain hole.

DETAILED DESCRIPTION OF THE PREFERRED EMBODIMENT

Figure 1:
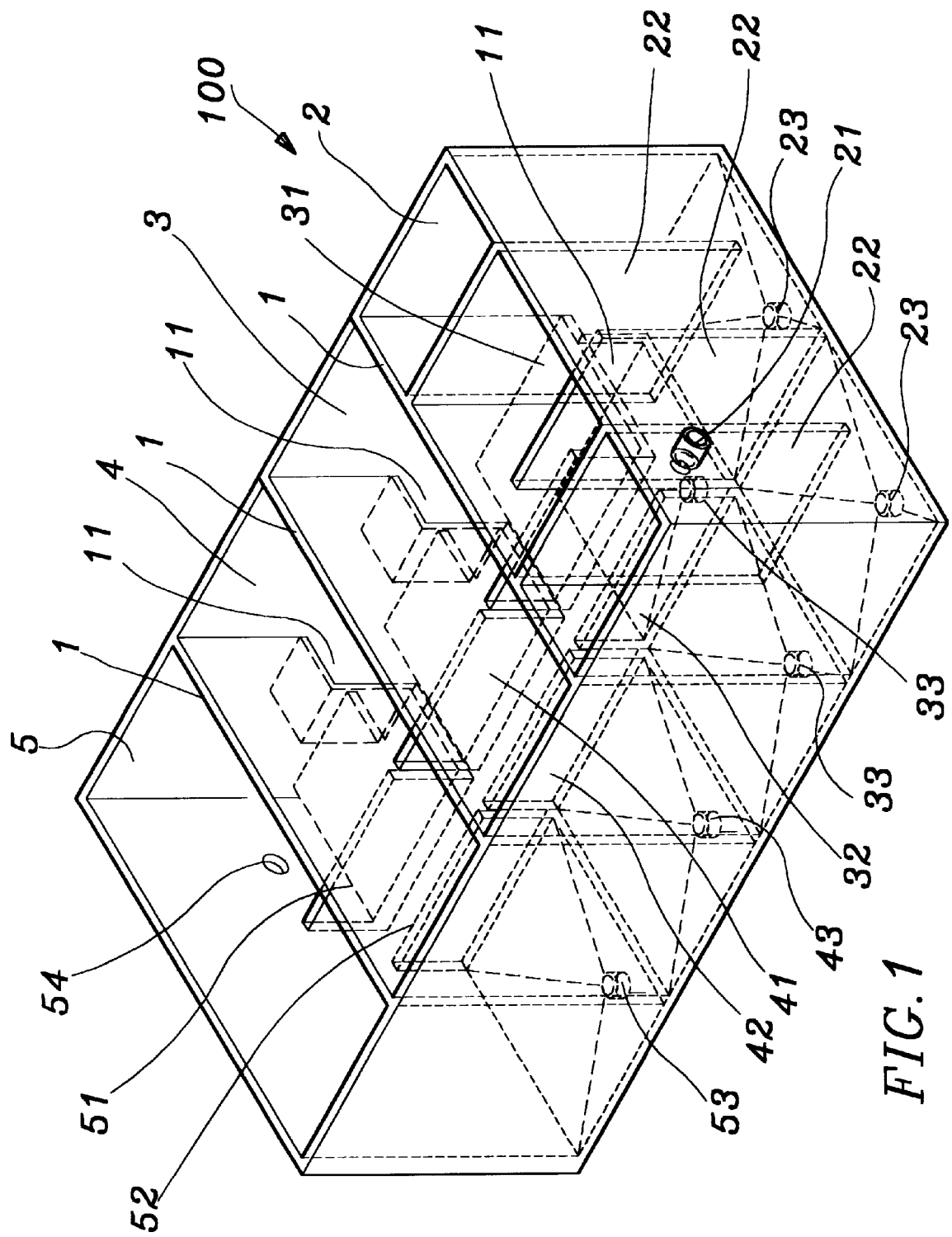
FIG. 1 is a perspective view of a combination water filter tank according to the present invention.
Figure 2:
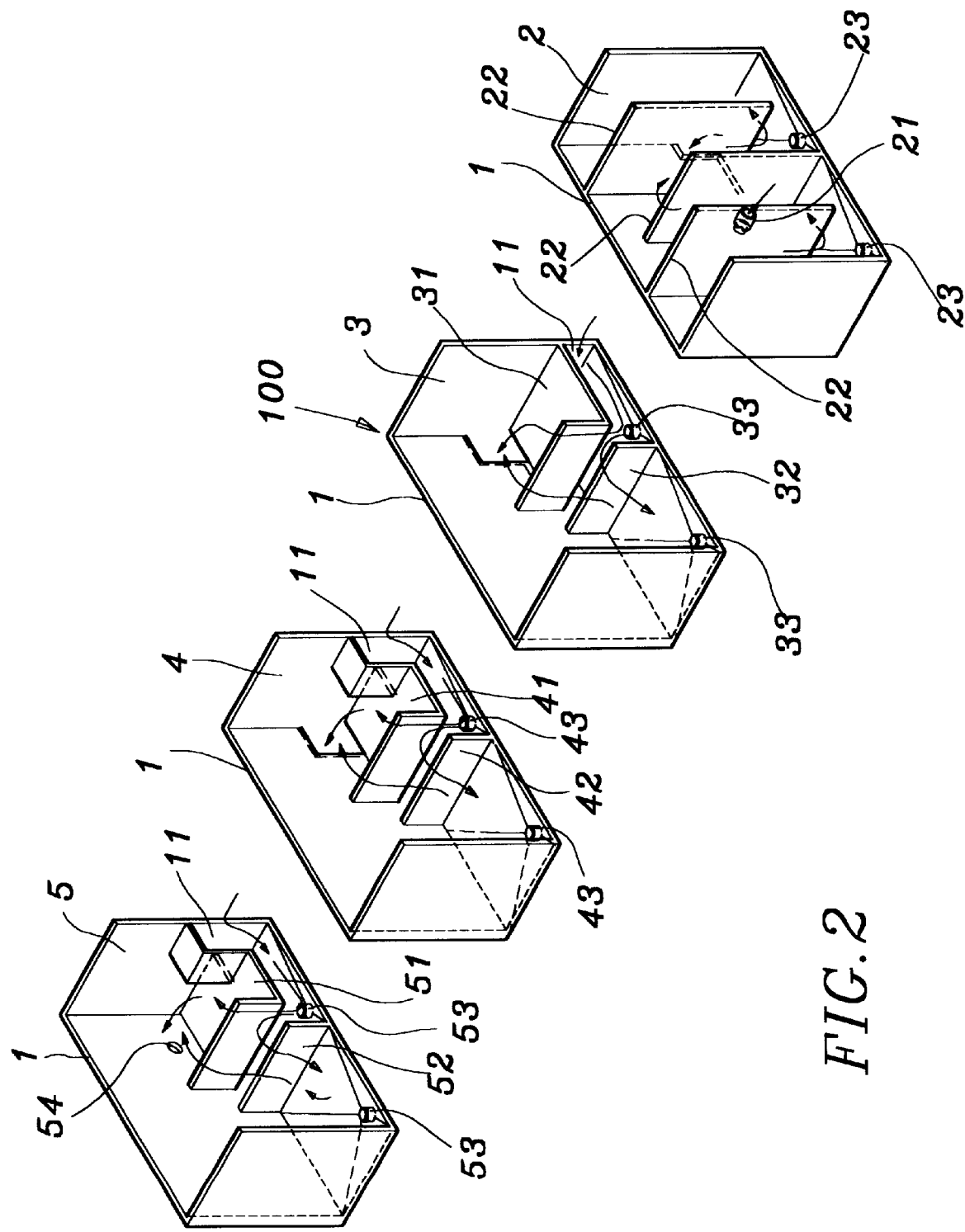
FIG. 2 is an exploded view of the combination water filter tank shown in FIG. 1.

Referring to FIGS. 1 and 2, a combination water filter tank is shown comprising a rectangular housing 100. Three transverse partition boards 1 are disposed in the housing 100, defining four sedimentation chambers 2, 3, 4 and 5. The transverse partition boards 1 each comprise a water guide hole 11. The first sedimentation chamber 2 comprises a water inlet 21 at one side, and a plurality of longitudinal partition boards 22 of different heights. The second, third and fourth sedimentation chambers 3, 4 and 5 each comprise a longitudinal partition board 32, 42 or 52 disposed on the middle, and a substantially L-shaped water guide board 31, 41 or 51 suspended at one at an elevation higher than the topmost edge of the longitudinal partition board 32, 42 or 52. The sedimentation chambers 2, 3, 4 and 5 each further comprise a plurality of drain holes 23 at the bottom side. The bottom wall of each sedimentation chamber 2, 3, 4 or 5 curves inwards toward the respective drain holes 23. When water is guided from a water source through the water inlet 21 into the combination water filter tank, it flows over the longitudinal partition boards 22 in the first sedimentation chamber 2, and then flows in proper order through the second, third and fourth sedimentation chambers 3, 4, and 5 along the respective L-shaped water guide boards 31, 41 and 51 via the respective water guide holes 11. Because of the buffering of the partition boards 22, 32, 42 and 52 and the L-shaped water guide board 31, 41 and 51, water flows slowly and smoothly through the sedimentation chambers 2, 3, 4 and 5, enabling solid matter to settle to the bottom. Filtered pure water flows out of the fourth sedimentation chamber 5 through a water outlet 54.

Because the bottom wall of each sedimentation chamber 2, 3, 4 or 5 curves inwards toward the respective drain holes 23, sediment is gathered at the drain holes 23, 33, 43 and 53. When the drain holes 23, 33, 43 and 53 are opened a certain length of time after filtration, sediment is guided out of the combination water filter tank.

While only one embodiment of the present invention has been shown and described, it will be understood that various modifications and changes could be made thereunto without departing from the spirit and scope of the invention disclosed.

What the invention claimed is:

1. A combination water filter tank comprising a rectangular housing, three transverse partition boards disposed in said housing and defining a first sedimentation chamber, a second sedimentation chamber, a third sedimentation chamber and a fourth sedimentation chamber, a water inlet for guiding water from an external water source into said first sedimentation chamber for enabling intake flow of water to flow from said first sedimentation chamber toward said fourth sedimentation chamber through said second sedimentation chamber and said third sedimentation chamber, a plurality of first longitudinal partition boards of different heights respectively disposed in said first sedimentation chamber, three L-shaped water guide boards respectively suspended in said second sedimentation chamber, third sedimentation chamber and fourth sedimentation chamber, a plurality of second longitudinal partition boards respectively disposed in said second sedimentation chamber, third sedimentation chamber and fourth sedimentation chamber on the middle at an elevation below said L-shaped water guide boards, and a water outlet for guiding water out of said fourth sedimentation chamber.

2. The combination water filter tank of claim 1 wherein said sedimentation chambers each comprise a bottom wall, and at least one drain hole on said bottom wall for guiding sediment out of said housing, said bottom wall being curved inwards toward said at least one drain hole.

* * * * *